July 3, 1934.   G. BODEN   1,965,520
PANEL FASTENER
Filed March 20, 1933
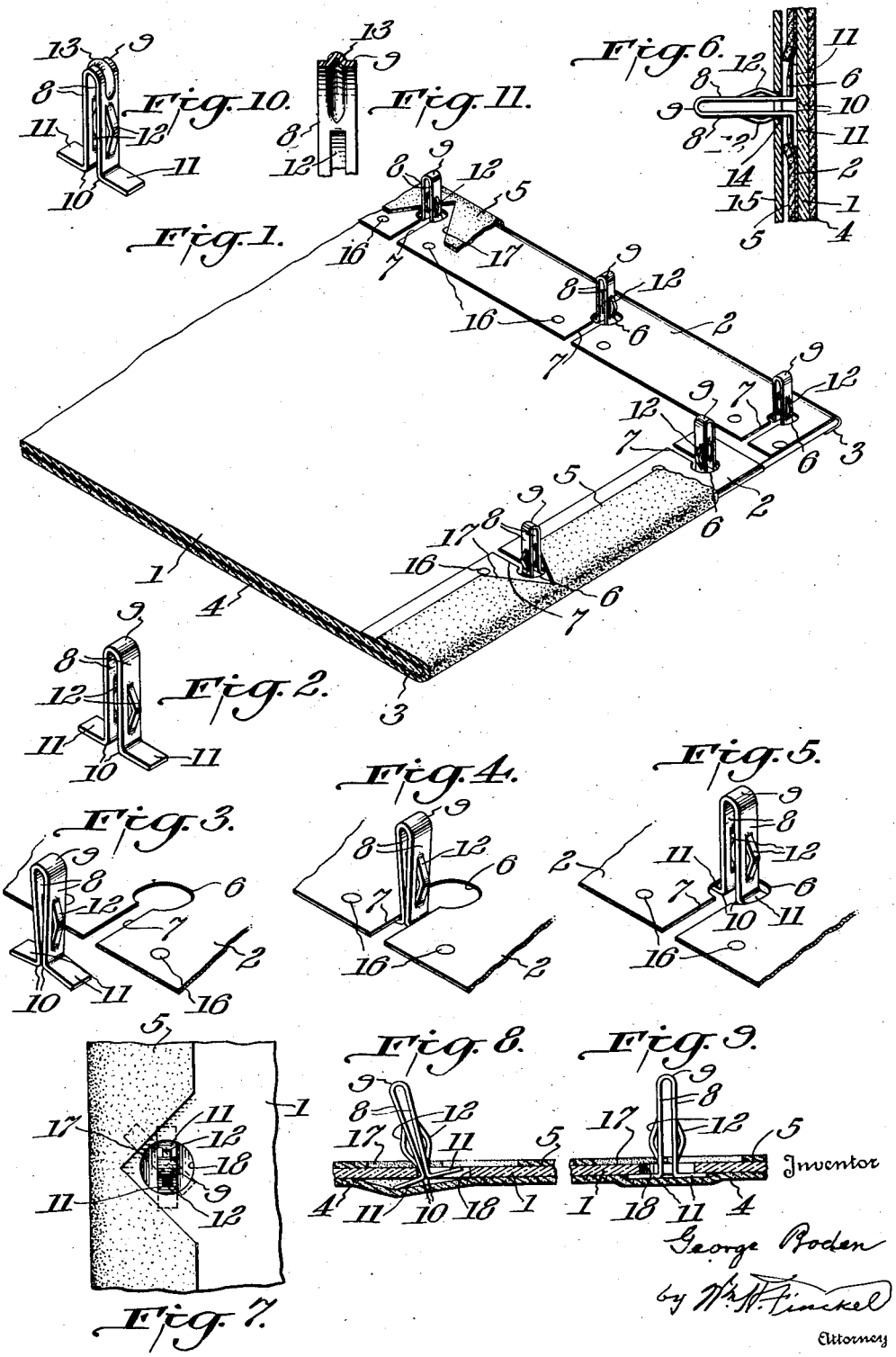
Inventor
George Boden
by W. H. Finckel
Attorney Patented July 3, 1934

1,965,520

UNITED STATES PATENT OFFICE 1,965,520

PANEL FASTENER

George Boden, Waterbury, Conn., assignor to Scovill Manufacturing Company, Waterbury, Conn., a corporation of Connecticut Application March 20, 1933, Serial No. 661,823

10 Claims. (Cl. 24—213)

This invention relates to separable fasteners, and particularly to a stud element and the means whereby it may be assembled with a support to produce an arrangement of parts suitable for use in attaching upholstery panels and the like to the doors and other parts of automobile bodies.

Upholstery panels for automobile bodies, particularly such panels as are used upon the doors, are, according to the present practice, attached to the doors by a plurality of separable fasteners including stud elements arranged around and adjacent to the edges of the panels on their inner or concealed faces, and these stud elements are made to engage with holes provided in the metal flanges of the doors, which holes act as the complemental socket elements for the stud elements. The arrangement of the stud elements upon the panels is such that they will register substantially axially with the holes in the door flanges. Thus an upholstered panel, with the stud elements applied thereto, may be positioned against the flanges of a door and the stud elements driven home in their complemental holes in the door flanges by striking the panel in line with each stud element with the flat of the hand or with an appropriate tool. It sometimes happens that the arrangement of the stud elements and the holes in the door flanges is such that they do not fall in exact axial alignment, and the present practice by which this misalignment is overcome is to so mount the stud elements on the panel that they may be capable of a slight lateral shifting or floating movement to permit them to register with their complemental holes or socket elements.

Manufacturers of automobile bodies provide large stocks of upholstered panels ready for use, and as these panels are customarily stacked one upon another, it has been found inexpedient to have the stud elements applied to and forming a part of the panels because of the fact that the stud elements will mar the upholstery fabric of the panels which bear against them. It has therefore become the practice to have the assembly of the stud elements with the panels of such form that the stud elements may be applied to the panels just prior to their application to the body parts.

Various types of panel fasteners have been designed to meet the conditions referred to, and these types of fasteners are now well known.

The object of the present invention is to provide a panel fastener which will satisfy all the conditions mentioned, which may be relatively cheap and simple to manufacture, is easy to install, and will not become unserviceable after repeated application and removal.

The invention contemplates a panel fastener including a stud element formed, preferably, of a strip of sheet metal bent to U-form to provide a shank having two interconnected legs and a base-forming portion, the shank being slitted to provide outwardly projecting means for engagement with a complemental socket. This stud element may be assembled with a support, for example an upholstery panel, either by means of an apertured plate applied to the panel, or by means of apertures in the panel itself, the construction of the stud element being such that its legs may be compressed at their free ends to permit the base-forming portion to be entered in the aperture, all as will be explained hereinafter more fully and finally claimed.

In the accompanying drawing illustrating the invention, in the several figures of which like parts are similarly designated, Figure 1 is a fragmentary perspective view illustrating an upholstery panel with the stud elements of the invention applied thereto. Fig. 2 is a perspective view of one of the stud elements. Figs. 3, 4 and 5 are fragmentary perspective views illustrating the mode of assembling a stud element with its retaining plate. Fig. 6 is a fragmentary sectional elevation illustrating the assembly of the upholstery panel with the flange of a door or other body part. Fig. 7 is a plan view illustrating a modification of the invention, in which the assembly omits the attaching plate. Figs. 8 and 9 are fragmentary sectional elevations illustrating the mode of application of a stud element in the assembly illustrated in Fig. 7. Fig. 10 is a view similar to Fig. 2, but illustrating a modified form of stud element, and Fig. 11 is an enlarged fragmentary sectional view of the upper portion of the stud element illustrated in Fig. 10.

Referring particularly to Fig. 1, it will be seen that the upholstery panel comprises a backing or support 1 adjacent to the edges of which are applied thin metal plates 2 having portions 3 extending around and tightly embracing the edges of the panel and forming a means of attachment of the plates thereto. Over the face of the support 1 opposite to that on which the plates 2 are arranged is applied the covering of upholstery material 4, which may be padded or otherwise appropriately fashioned, as is now the practice, and this upholstery fabric may be cemented or otherwise secured to the support and has its edges turned over the edges of the support and appropriately affixed to the plates 2, as indicated at 5.

The plates 2 are provided with appropriately spaced apertures 6, and from each of these apertures a slot 7 extends to the inner edge of the plate, as will be explained more fully hereinafter.

As shown in Fig. 2, the stud element comprises, preferably, an appropriate length or strip of sheet metal of suitable width, gage and stiffness, bent to U-shape to provide a shank comprising two similar spaced legs 8 interconnected by a bend 9 forming the leading end of the stud element and having at their free ends 10 laterally offstanding portions 11 which provide the base-forming portion of the stud element. The legs 8 are provided with parallel longitudinal slits the material between the slits being bowed or pressed outwardly between its ends to form ears 12 for engagement with a complemental socket. It will be apparent that the legs 8 are preferably arranged substantially parallel and that the ears provide a means for resilient or snap engagement of the stud shank with its complemental socket.

In order that the bend 9 may have such resiliency, stiffness and strength as to accommodate repeated compression and expansion of the free ends 10 of the legs 8, it may be appropriately spring tempered, or, to the same end, it may be provided with an integral strengthening rib 13 such as that illustrated in Figs. 10 and 11, this rib extending over the bend 9 and down the legs into proximity to the ears 12. Obviously, either of the means described for providing resiliency, strength and stiffness in the bend may be adopted by the manufacturer, or any other appropriate means may be used within the purview of the invention.

Referring again to Fig. 1, and to Figs. 3 to 5 inclusive, it will be seen that the apertures 6 in the plates 2 are of a size greater than the width of the shanks of the stud elements or of the legs comprising such shanks, thus providing for the desired lateral shifting or floating movement hereinabove referred to. It will be noted, however, that the width of the slots 7 is less than the width of the shanks of the stud elements, and thus when once the stud elements have been assembled in the apertures 6 they cannot escape therefrom through the slots 7.

In assembling the stud elements with the upholstery panels, their legs will be so compressed, as illustrated in Fig. 3, that their free ends 10 are in contact. This so reduces the width of their shanks that they may be slipped through the slots 7, as illustrated in Fig. 4, and into the apertures 6, as indicated in Fig. 5, with the portions 11 constituting their bases lying between the support or backing 1 and the portions of the plate 2 adjacent to the slots 7 and apertures 6. The stud elements when assembled, as illustrated in Figs. 1 and 5, may rotate in the aperture 6, and may shift or float laterally therein but may not escape therefrom. Thus they may be appropriately accommodated to the positions of the holes 14 in the door flanges 15 (see Fig. 6), which act as their complemental socket elements, to enable them to be separably engaged with these holes.

If desirable or necessary, the portions of the plates 2 adjacent to the slots 7 may be affixed to the backing 1 by means of fastenings 16 of appropriate nature, or other equivalent means.

In order that the overlapped portions 5 of the upholstery material may not interfere with the application or functioning of the stud elements, these portions may be notched out adjacent to each aperture 6, as indicated at 17.

Referring now to Figs. 7 to 9 inclusive, it will be seen that instead of providing the apertured plates 2 as a means for assembling the stud elements with the support or backing member 1, apertures 18 may be provided in the member itself. These apertures will be of such a size that when the stud elements are compressed they may be inserted, base portion first, through the apertures 18 from the back or normally concealed face of the support or backing member 1, but when they are thus inserted and their legs are permitted to expand to normal position, as illustrated in Fig. 9, they cannot escape from the apertures, even when laterally moved with respect thereto, as illustrated in broken lines in Fig. 7.

When the stud elements are assembled with the support or backing member 1 as last described, their base portions lie between the upholstery fabric and the outer face of the support or backing member.

From the foregoing description, it will be apparent that the panel fastener of this invention fulfills all of the requirements of installations of this type hereinbefore referred to. The stud members may be assembled with the upholstery panel after the application of the upholstery fabric thereto, and without disturbing the upholstery fabric, because they are assembled from the face of the panel opposite to that upon which the upholstery fabric is carried, the panels prior to application thereto of the stud members are perfectly flat and may be stacked without injury, and the stud members are of such form and are so constructed as to be capable of repeated application and removal not only with respect to the panel itself, but to the holes which are their complemental sockets, without failing to properly and adequately function.

Various changes and modifications other than and in addition to those particularly referred to are considered to be within the spirit of the invention and the scope of the following claims.

What I claim is:—

1. In a stud element for separable fasteners, a shank comprising a pair of legs arranged in substantially parallel spaced relation and interconnected to form the leading end of the stud element, and provided with a base-forming portion, said shank formed with longitudinally arranged outwardly projecting ears terminating in said shank between said leading end and said base-forming portion, said ears providing a means for resilient engagement of said shank with a complemental socket, said ears having integral connection at their opposite ends with said shank.

2. In a stud element for separable fasteners, a shank comprising a pair of interconnected legs provided with base-forming portions, said legs being longitudinally slitted and the metal between the slits bowed outwardly between ends to provide outwardly projecting ears for engagement with a complemental socket, said ears having integral connection at their opposite ends with said legs.

3. In a stud element for separable fasteners, a shank comprising a pair of interconnected legs having free ends and provided with a base-forming portion, said shank being longitudinally slitted and the metal between the slits bowed outwardly between the ends to provide outwardly projecting means for engagement with a complemental socket, said outwardly projecting means having integral connection at opposite ends with said shank.

4. In a stud element for separable fasteners, a shank comprising a pair of resiliently interconnected legs having free ends and provided with a base-forming portion, said shank being longitudinally slitted to permit the metal between the slits to be pressed outwardly to provide outwardly projecting means for engagement with a complemental socket, said outwardly projecting means having integral connection at opposite ends with said shank.

5. In a stud element for separable fasteners, a shank comprising a pair of interconnected legs having free ends and provided with a base-forming portion, said legs being longitudinally slitted to permit the metal between the slits to be pressed outwardly to provide outwardly projecting ears for engagement with a complemental socket, said ears having integral connection at their opposite ends with said legs.

6. In a stud element for separable fasteners, a shank comprising a pair of interconnected legs having free ends provided with laterally offstanding portions forming a base, said legs formed with substantially parallel longitudinal slits, and the material between such slits fashioned to provide outwardly projecting ears for engagement with a complement socket, said ears having integral connection at their opposite ends with said legs.

7. In a stud element for separable fasteners, a shank comprising a strip of resilient material bent to U shape and forming a pair of spaced interconnected legs having free ends provided with laterally offstanding portions forming a base, said legs being longitudinally slitted to permit the metal between the slits to be pressed outwardly to provide outwardly projecting ears for engagement with a complemental socket, said ears having integral connection at their opposite ends with said legs.

8. In a stud element for separable fasteners, a shank comprising a strip of flat resilient material bent to U shape and forming a pair of spaced interconnected legs having free ends provided with laterally offstanding portions forming a base, said legs provided with substantially parallel slits longitudinally arranged and the metal between such slits pressed outwardly to form ears for engagement with a complemental socket, said ears having integral connection at their opposite ends with said legs.

9. In a stud element for separable fasteners, a shank comprising a strip of flat material provided with a bend forming a leading end for said stud element and a pair of spaced interconnected legs having ends providing a base, said legs provided with longitudinally arranged outwardly projecting ears terminating in said legs between said leading end and base and having integral connection at their opposite ends with said legs, said ears adapted for engagement with a complemental socket, and the bend of said strip interconnecting said legs being resilient and provided with a reinforcing rib extending across said bend and into said legs.

10. A panel fastener, including a stud element having a shank comprising a pair of spaced resiliently interconnected legs having laterally offstanding free ends providing a base portion, and means for assembling said stud element with a support, including a plate for attachment to said support, said plate provided with an aperture of a size to receive said shank and having a slot extending from its edge to said aperture, said slot being of less width than the width of said legs and than the spacing thereof, said legs capable of being compressed at said base-forming portion to accommodate the shank to the width of said slot, whereby said shank may be passed through said slot and into said aperture with said base portion lying between said plate and support, said legs being thereafter permitted to assume their normal spaced relation, the relative dimensions of said shank and slot thereafter preventing escape of said shank through said slot, said base portion having a dimension greater than the size of said aperture.

GEORGE BODEN.